Dec. 1, 1959    L. G. STROUP    2,915,690
MAGNETIC AMPLIFIER ELECTRIC MOTOR CONTROL
Filed July 29, 1954
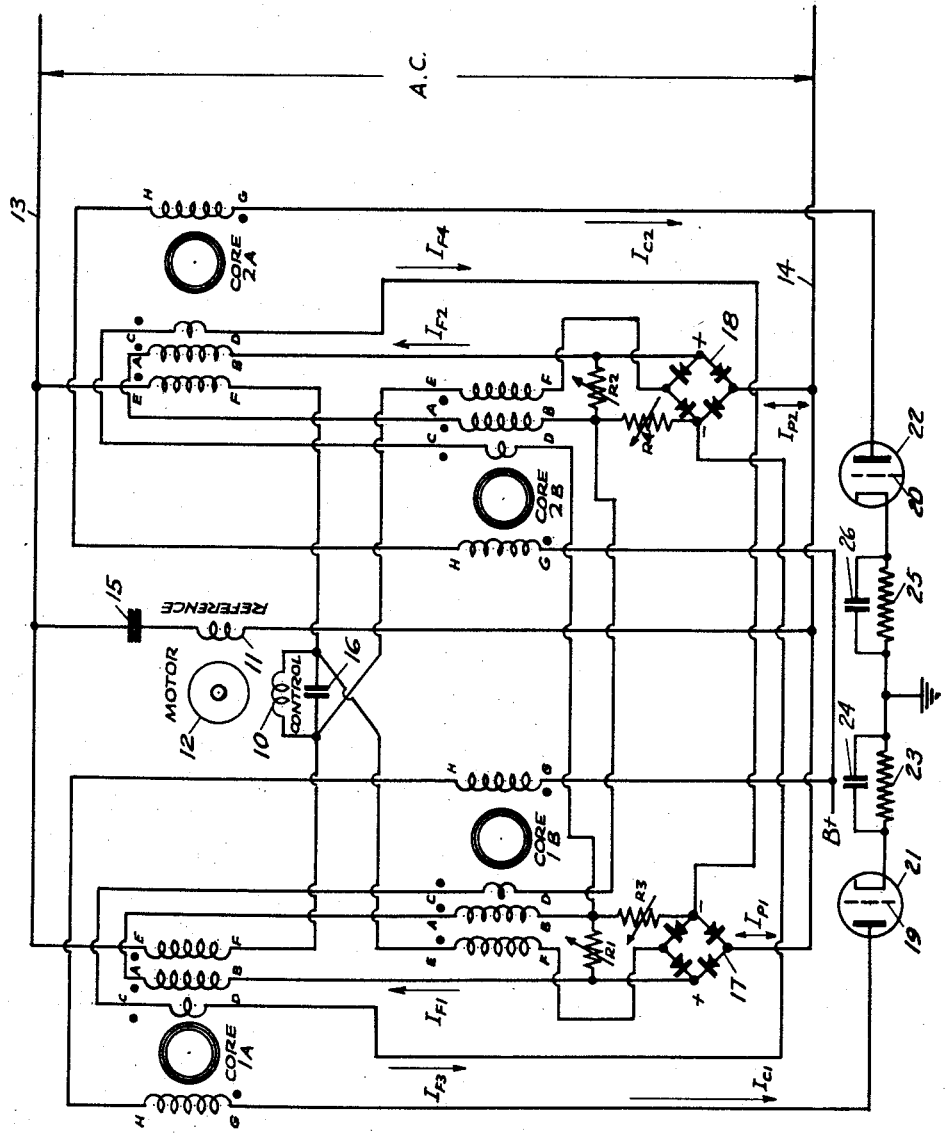
INVENTOR
LESLIE G. STROUP
BY Elmer J. Jorn
ATTORNEY

United States Patent Office 2,915,690
Patented Dec. 1, 1959

2,915,690

MAGNETIC AMPLIFIER ELECTRIC MOTOR CONTROL

Leslie G. Stroup, Cochituate, Mass., assignor to Raytheon Company, a corporation of Delaware Application July 29, 1954, Serial No. 446,474

2 Claims. (Cl. 318—207)

This invention relates to magnetic amplifiers, and particularly to amplifiers utilizing saturable reactors to produce power amplification by the interaction of D.C. and A.C. components upon permeable core structures having current receiving windings arranged for bidirectional power output, for operation of a reversible load such as an A.C. servo motor or equivalent utilization means.

The invention is characterized by the application of positive feedback connections to auxiliary core windings in a reversible flow system, the manner of feedback application being such as to achieve a magnetic field strengthening to a controllable degree, and a correspondingly controllable overall gain in the amplification capacity of the system.

More specifically, the invention provides, in a bidirectional output system having at least two saturable reactors, and dual triggering apparatus for controlling the alternate application of energizing A.C. power to the two reactors in accordance with magnetic field saturation (D.C.) control current, supplied to the reactors by way of the usual saturation control windings, an auxiliary gain control circuit in the form of auxiliary field control windings supplied with feedback energy in a cross-compounded manner, assuring maintenance of a constant gain in output, in opposite directions alternately, notwithstanding the periodic shuttling of the incoming saturation control current between the two reactors, and thereby achieving for the disclosed bidirectional output type of system the same proportion of feedback-derived gain that has heretofore been achievable only in the simpler, unidirectional output type of system.

Other characteristics of the invention will be apparent upon reference to the following description of the embodiment of the invention schematically illustrated in the accompanying drawing, which embodiment discloses, by way of example, the principles of the invention and the best mode presently known for applying such principles.

The drawing shows magnetic amplifier apparatus for delivering current in each of two directions, alternately, to a stator winding 10 constituting one phase of a two-phase servo motor whose rotor is indicated at 12; the other stator winding 11 being adapted to receive the reference phase of the energizing current, and for this purpose it is shown as connected directly across the A.C. power lines 13 and 14, in series relation to control condenser 15. A similar condenser 16 parallels the winding 10.

The illustrated amplifying system includes two saturable reactors, each composed of a pair of toroidal ferromagnetic cores, 1A—1B, and 2A—2B, but the invention may also be applied to compound, or stacked, cores of either toroidal or rectangular contours, in lieu of the separated cores illustrated. Each core has four windings, as shown, with the power windings EF being in series relation to the control field winding 10 of the servo motor for the purpose of energizing said winding in a direction, and to a degree, determined by the phase and impedance values prevailing, from one moment to another, in one or the other set of power windings.

The D.C. control current $I_{c1}$ (or $I_{c2}$) through windings GH controls the degree of saturation of the respective cores, and thus controls the impedance, the phase, and the voltage values prevailing in the associated main power windings EF. The windings GH of each core set are energized from the positive side of a B voltage source, under the control of the alternately activated grids 19 and 20 of push-pull amplifiers 21 and 22, and are wound oppositely; that is, one winding GH has the same direction as its associated main power winding EF, while the other's direction is opposite to that of its associated winding EF. As a result, any voltages induced in windings GH by the current flowing through windings EF are self-canceling. The same is true of positive feedback windings AB and CD, now to be described. (The dots adjacent the respective windings indicate their polarity.)

To achieve the desired gain for output currents $I_{p1}$ and $I_{p2}$ the invention proposes the rectification of these alternating outputs and the addition to each core of a pair of auxiliary feedback windings AB and CD, the former being connected across diagonally opposite points on the proximately disposed full wave rectifier bridges 17 and 18, respectively, and the latter being cross-connected into the feedback circuits leading to the remotely disposed windings AB. Thus there is achieved, first, a voltage boosting effect, and secondly, a cross-compounding effect wherein the main control current $I_{c1}$ and $I_{c2}$ are first supplemented by the feedback through auxiliary windings AB, and at the same time the gain thus achieved is protected against dissipation by the gain-holding effects of the cross-compounded auxiliary windings CD connected in series relation to the feedback windings AB, but in cross-sequence therewith, so that the effect is to offset the undesired voltage rise tendency reflected in the "idling" side of the system as a result of the impedance decrease which accompanies the rise of control current in the "working" side of the system—that is, the side of the system which is driving the rotor 12 at any given instant. The driving side, of course, is the side whose control grid (19 or 20, as the case may be) is receiving triggering voltage at any given instant, and the speed of rotation in either direction depends upon the magnitude of such triggering voltage. The manual adjustments of the shunting resistors $R_1$ to $R_4$, inclusive, will control the relative proportions of current flow in windings AB and CD, and consequently, the proportion of system gain to be derived from the cross-compounded feedback method of gain control just described.

Without the cross-compounded compensating arrangement above described, the effect of the feedback circuits to windings AB would be to increase the voltage across the power windings EF of the idling reactor, as well as the working reactor, thus defeating (at least partially) the main objective of the feedback, namely, to estabish a net gain in the amplification characteristics of the system. The control circuits carrying currents $I_{c1}$ and $I_{c2}$ originate at the source designated B+, and are rendered alternately effective in accordance with the push-pull action of the control tubes 21 and 22, whose plate circuits include the windings GH. The cathode circuits of tubes 21 and 22 may include the usual biasing resistors and protective condensers, as indicated at 23 to 26.

The auxiliary windings AB and CD, and the feedback and cross-compound circuits leading thereto, may be incorporated in various arrangements for magnetic amplification, with or without the particular input, output, and rectification adjuncts described herein. In fact, the invention is applicable to any arrangement wherein the saturation of one reactor (or reactor set) tends to cause the voltage to increase across the power windings of another reactor (or reactor set) which has positive feedback.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a magnetic amplification full bridge system two pairs of reactors having externally energized alternately operative output circuits embracing a single load to be controllably energized with a reversible phase current, control windings connected in series with each pair of reactors, said output circuits including a pair of series connected windings applied to each respective pair of reactors, rectification means in series with said output windings, a first set of auxiliary windings inductively related to said output windings but shunted completely away from said load, said auxiliary windings being so connected to said rectification means that unidirectional current only is applied thereto, and resistance means shunted across said auxiliary windings for controlling the degree of gain effected by said auxiliary windings, and a second set of auxiliary windings connected in cross-compounded series relation to said first set of auxiliary windings to counteract an undesirable voltage increase due to positive feedback in the non-working side of said first set of auxiliary windings.

2. The amplification system of claim 1 in which the load to be controllably energized comprises a reversible alternating current motor having a single control winding.

References Cited in the file of this patent

UNITED STATES PATENTS

| | | |
|---|---|---|
| 2,247,983 | Barth | July 1, 1941 |
| 2,338,423 | Geyger | Jan. 4, 1944 |
| 2,729,779 | Milsom | Jan. 3, 1956 |
| 2,849,544 | Herz et al. | Aug. 26, 1958 |

OTHER REFERENCES

Magnetic Amplifier Circuits, by Geyger; Chapter 9, sections 3 and 4 (pages 133–140) relied on; published 1-26-54.